United States Patent [19]

Neil

[11] Patent Number: 4,695,119
[45] Date of Patent: Sep. 22, 1987

[54] INFRARED OPTICAL SYSTEM

[75] Inventor: Iain A. Neil, Bearsden, Scotland

[73] Assignee: Barr & Stroud Limited, Glasgow, Scotland

[21] Appl. No.: 460,549

[22] Filed: Jan. 13, 1983

[30] Foreign Application Priority Data

Jan. 14, 1982 [GB] United Kingdom ............... 8201045

[51] Int. Cl.$^4$ .................... G02B 15/14; F21V 9/06; B29D 13/18
[52] U.S. Cl. ........................... 350/1.2; 350/1.3; 350/1.4; 350/432; 350/559
[58] Field of Search .............. 350/1.2, 1.3, 1.4, 420, 350/441, 540, 541, 559, 567, 568, 432

[56] References Cited

U.S. PATENT DOCUMENTS

| 2,962,925 | 12/1960 | Kasson et al. | 350/567 |
| 3,363,962 | 1/1968 | Vogl | 350/1.4 |
| 4,469,396 | 9/1984 | Neil | 350/1.3 |

FOREIGN PATENT DOCUMENTS

| 0059127 | 9/1982 | European Pat. Off. | 350/541 |
| 0348835 | 2/1922 | Fed. Rep. of Germany | 350/543 |
| 0400869 | 10/1973 | U.S.S.R. | 350/441 |

OTHER PUBLICATIONS

G. R. Noyes, SPIE (Proc), vol. 131, Jan. 1978, p. 24.

Primary Examiner—Stephen C. Buczinski
Attorney, Agent, or Firm—Finnegan, Henderson, Farabow, Garrett & Dunner

[57] ABSTRACT

A forward looking infrared optical system comprises a refractor telescope 20 in combination with a powered window and fold mirror arrangement 30. Arrangement 30 comprises a powered window element J with concentric spherical refractive surfaces having their common center of curvature on the common optical axis 19 where the latter is folded by the reflective surface 27 of the mirror element I. Because the window element J is powered it introduces significant spherical aberration and some color aberration to the system however telescope 20 provides compensation for such aberrations by being non-afocal and non-diffraction limited. This is achieved by the objective system 21 of the telescope 20 being telephoto and formed of two elements H,G of which H is positively powered and G is negatively powered and color corrective. The refractive surfaces of element G are each spherical whereas at least one refractive surface (15) of element H is aspheric. Element G is made of a material having a lower refractive index than that of element H.

5 Claims, 3 Drawing Figures

INFRARED OPTICAL SYSTEM

This invention relates to a forward looking infrared optical system.

The arrival of high performance forward looking infrared systems (commonly known by the acronym FLIR) has led to a demand for a high performance telescope and a number of afocal designs have been developed where the telescope resolution is diffraction limited. Some of these afocal telescopes are of dual magnification and particular designs have been developed giving short overall length (i.e. compactness) with low pupil aberrations whilst minimising optical and mechanical complexity.

In various forms of FLIR systems it is a practical requirement to locate the telescope behind a window in, for example, a bulkhead so that the telescope is protected from the external environment which may be at greatly elevated pressure. In this situation the window itself may be dome-shaped and accordingly optically powered and it has been found that the presence of the powered window degrades the performance of the afocal telescope to such an extent that the FLIR system is rendered practically useless.

It is an object of the present invention to provide a forward looking infrared optical system comprising a telescope which will operate in conjunction with a powered window.

According to the present invention there is provided a forward looking infrared optical system comprising a refractor telescope having a fixed focus achromatic telephoto objective system composed of a primary objective lens element and a secondary objective lens element aligned on a common optical axis, at least one refractive surface of the primary objective element being aspheric and each of the other refractive surfaces of the objective system being substantially spherical, the secondary objective lens element being negatively powered and having a refractive index lower than that of the primary objective element which is positively powered, the degree of asphericity of said aspheric surface or surfaces being such that the telescope is neither afocal nor diffraction limited, in combination with an optically powered window the two refractive surfaces of which are substantially spherical and concentric and have their common centre of curvature located on said common optical axis, wherein the spherical aberration introduced to the system by the window is compensated by the spherical aberration of the telescope so that the system is substantially afocal and diffraction limited.

The window may be either positively or negatively powered but in either case the spherical aberration introduced into the FLIR system can be compensated by the telescope the objective system of which introduces compensatory spherical aberration by virtue of the degree of asphericity accorded to the aspheric surface or surfaces therein. It will of course be understood that where both surfaces of the primary objective lens element are aspheric the effective total asphericity of the telescope is apportioned between the two surfaces each of which will then have a much reduced degree of asphericity in comparison to that which would exist if only one surface of the primary objective lens element were aspheric.

The system of the present invention may have a folded common optical axis provided by a fold mirror located optically between the window and the primary objective lens element in order to render the system periscopic. Furthermore if the fold mirror is located at the common centre of curvature of the window refractive surfaces it may conveniently by used as a scan mirror pivotal about the said centre of curvature so that the system accepts radiation from different entrance pupils lying either on or off the optical axis without significant degradation in optical performance of the FLIR system because of the geometry of the mirror and window combination.

The telescope forming part of the FLIR system may be either single or dual magnification but in the latter case when operating in high magnification mode the scan available from the scan mirror is restricted in comparison to that available for the telescope in low magnification mode because of the differing apertures required at the window for the radiation ray bundles.

It will be appreciated that the FLIR system of the present invention is both optically and mechanically simple having regard to the fact that the telescope objective system is composed of only two lens elements of which one has spherical refractive surfaces whilst the other either has one spheric and one aspheric refractive surface or two aspheric refractive surfaces but in any event the degree of asphericity is relatively small. The window is also optically simple having two concentric refractive surfaces and the fold mirror when present has only a single planar reflective surface. The refractive elements of the system naturally require to be transmissive to radiation in the infrared waveband; the fold mirror may conveniently be made of aluminium having been diamond fly-cut and thereafter surface coated for example with magnesium fluoride to provide a highly reflective and durable surface.

The telescope objective system may be colour corrected by making the dispersive V-value of the secondary objective lens element less than that of the primary objective lens element. The colour correcting lens element of the objective system may be zinc selenide, preferably of the type made by chemical vapour deposition (commonly known by the acronym, 'CVD') which provides a material with low inhomogeneities whereas the other lens elements of the telescope and the window may be made of germanium, all of which materials have a useful spectral bandpass in the 3-13 micron infrared wavelength region. Alternatively, the colour correcting lens element may be made from any other optical material which exhibits suitable physical characteristics. Table VI recites some of the most suitable optical materials.

The colour correcting lens element may be fixedly mounted with respect to the other lens elements of the telescope but conveniently it is movable along the optical axis as a result of which the FLIR system can be compensated for changes in ambient temperature which produce shifts in position of the real image formed within the telescope. Also, such movement of the colour correcting lens element can be utilised to vary the focus of the system (without the system departing from its so-called 'afocal' nature) provided that the real image formed within the telescope is not of high quality. This is conveniently achieved when the colour correcting lens element is of low optical power since minimal magnification changes are produced when this element is moved.

Alternatively, or additionally, the system can be compensated for changes in ambient temperature by constructing the framework for the lens systems using materials of which at least two materials have different thermal expansion coefficients (i.e. passive mechanical athermalisation). The colour correcting lens element may be movable along the optical axis or it can be fixedly mounted with respect to the other lens elements at a position which provides the telescope when of the dual magnification type with two fixed focii, typically the hyperfocal focii.

When the telescope is of the dual magnification type because the high magnification lens system and the low magnification lens system cannot simultaneously be aligned on the optical axis it is required that they be alternately aligned on the optical axis. Although several methods may each accomplish this operation perhaps the most simple method employs a carousel type mechanism wherein the high and low magnification lens systems are aligned at ninety degrees to one another on a single carriage which can be rotated about a fixed point by ninety degrees in a manner whereby either the high magnification lens system is aligned with the common optical axis while the low magnification lens system is in a parked position hence providing the telescope with the high magnification mode or vice versa.

When the fold mirror is present and is arranged for scanning movement a simple drive mechanism can be employed to oscillate or possibly to rotate the mirror, the maximum useful scan angle being that at which significant vignetting of radiation occurs at the mirror or at the window.

An embodiment of the present invention will now be described by way of example with reference to the accompanying schematic drawings and tables.

Figure 1:
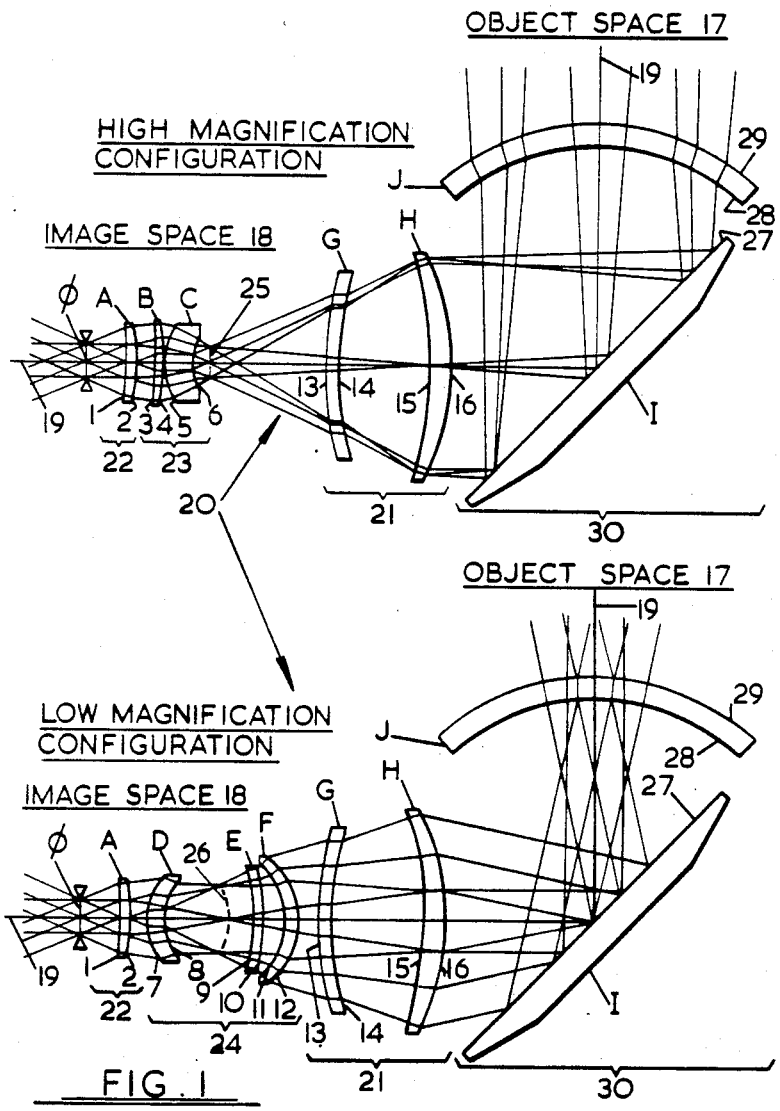
FIGS. 1 and 2 show configurations of the infrared optical systems of the present invention.

As is shown in FIG. 1 a FLIR system is formed by a telescope 20 in combination with a powered window and fold mirror arrangement 30, the telescope 20 having an objective system 21, a collimation system 22, a high magnification system 23 and a low magnification system 24 aligned on a common optical axis 19, the high and low magnification systems 23 and 24 being arranged in a manner whereby they are not simultaneously aligned on the common optical axis 19. The telescope 20 is of the refractor type and when the high magnification system 23 is aligned on the common optical axis 19 a real image 25 is formed whereas when the low magnification system 24 is aligned on the common optical axis 19 a real image 26 is formed, both images being formed from radiation entering the FLIR system from object space 17 via the window and mirror arrangement 30.

Figure 2:
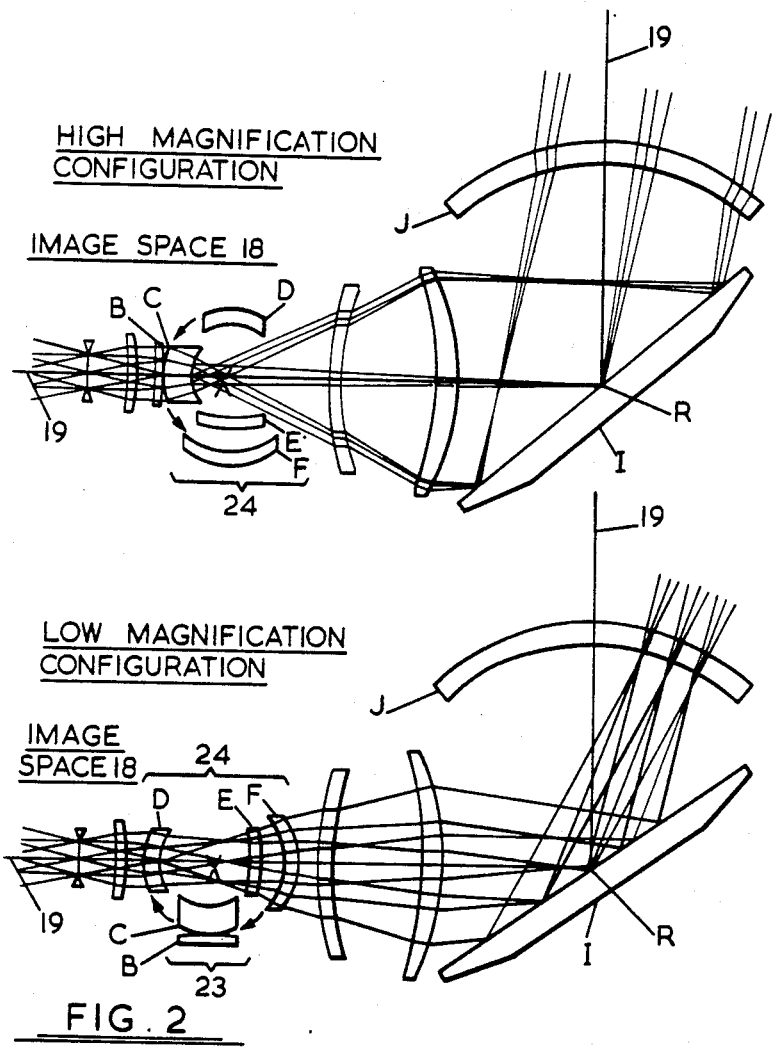

The window and mirror arrangement 30 is formed by a negatively powered window element J having spherical refractive surfaces 28, 29 which are concentric and having their common centre of curvature located on the common optical axis 19 where the latter is folded by the reflective surface 27 of mirror element I. As illustrated in FIG. 1 axis 19 is folded through 90°. Elements I and J together form a fixed focus system which accepts radiation ray bundles from two virtual entrance pupils in object space 17 lying on or off axis 19 of FIG. 1 depending on the orientation of mirror element I, FIG. 2 showing mirror element I turned through 5° in the high magnification mode and through 10° in the low magnification mode. Because window element J is powered it introduces significant spherical aberration to the FLIR system (as well as a much lesser degree of colour aberration) which would destroy the imaging quality of the FLIR system were it not for the fact that in accordance with the present invention the telescope 20 is rendered both non afocal and non-diffraction limited by means of the objective system 21 as will be explained.

The objective system 21 is telephoto and formed by a primary lens element H and a secondary lens element G, the latter being negatively powered (i.e. divergent) and colour corrective whereas the former is positively powered (i.e. convergent). Element G has refractive surfaces 13, 14 and element H has refractive surfaces 15, 16. The collimation system 22 is formed by a single positively powered lens element A with refractive surfaces 1,2. The high magnification system 23 is formed by two positively powered lens elements B,C with respective refractive surfaces 3,4 and 5,6. The low magnification system 24 is formed by three lens elements D,E,F of which the elements D and F are positively powered with respective refractive surfaces 7,8 and 11,12 and the element E is negatively powered with refractive surfaces 9,10. Element A forms a fixed focus system, elements B and C together form a fixed focus system, elements D,E and F together form a fixed focus system and elements G and H together form a fixed focus system so that the objective system 21 and the window and mirror arrangement 30 accepts bundles of rays from the two different entrance pupils formed in the object space 17 then either the high magnification system 23 collects radiation from the objective system 21, internally forms inverted real image 25 and provides an output ray bundle to the collimation system 22 or the low magnification system 24 collects radiation from the objective system 21, internally forms an inverted real image 26 and provides an output ray bundle to the collimation system 22, the collimation system 22 then provides two bundles of parallel rays which form an exit pupil $\phi$ in image space 18, the two bundles of parallel rays in image space 18 being identical excepting small differences of optical aberrations. The optical power of and the spacing between the various lens elements A, B, C, D, E, F, G, H, J is arranged such that in the high magnification mode the image 25 lies between refractive surfaces 5 and 13 and in the low magnification mode the image 26 lies between refractive surfaces 8 and 9.

The refractive surfaces 1, 2, 3, 4, 5, 6, 7, 8, 9, 10, 11, 12, 13, 14, 16, 28 and 29 are each substantially spherical i.e. if they are not truly spherical they are 'spherical' within the meaning of the art, whereas surface 15 in having an aspheric profile (and surface 27 in having a flat profile, i.e. if not truly flat it is 'flat' within the meaning of the art) are non-spherical.

The FLIR system is designed for use in the infrared wavelength region (i.e. 3-13 microns) and consequently the refractive indices of the refractive elements are relatively large but in order to provide sufficiently high optical performance lens element G is colour corrective, negatively powered and has a lower refractive index than element H. This is achieved for the 8-13 micron range by making lens elements A,B, C,D,E,F,H and J of germanium, the refractive index of which is 4.00322, and lens element G of zinc selenide the refractive index of which is 2.40653, measured at a wavelength of 10 microns and at a temperature of 20° C. In this case element G has a dispersive capacity, or V-value, of 77, where the V-value is defined as the ratio of the refractive index at 10.0 microns minus 1 to the refractive index at 8.5 microns minus the refractive index at 11.5 microns. The mirror element I is made of diamond fly-cut aluminium. These materials which are suited to being anti-reflection coated, when anti-reflection coated provide a FLIR system with at least 60% transmission, in both magnification modes, of incident radiation in the 8.5 to 11.5 micron range.

Because the objective system 21 has element G of lower refractive index than that of element H and surface 15 is aspheric the performance of the telescope 20 on its own can readily be made both non-afocal and non-diffraction limited simply by varying the degree of asphericity of surface 15. In fact it is relatively simple to render the telescope on its own very far from diffraction limited sufficiently so that the spherical aberration introduced to the FLIR system by window elements J of a wide range of curvatures can be compensated so that the FLIR system as a whole operates both afocally and at the diffraction limit.

The lens element G is preferably movable along the optical axis 19 whereas the other lens elements A,B,C,D, E,F,H and J are not and this permits compensation of the system against movements in the positions of the two images 25 and 26, induced by ambient temperature changes typically within the range $-10°$ C. to $+50°$ C. Furthermore, for fixed positions of the images 25 and 26 the FLIR system can be focussed on distant objects, typically within the ranges 40 meters to infinity for the high magnification mode and 8 meters to infinity for the low magnification mode.

Alternatively lens element G and the other lens elements A,B,C,D,E,F;H and J can be fixedly mounted. By suitably constructing the surrounding framework which supports lens elements E,F and H using a material or materials which afford high thermal expansion coefficients such as an ultra high molecular weight polyethylene (commonly known by the acronym 'UHMPE') and by constructing the remaining system framework using a material or materials which afford relatively low thermal expansion coefficients such as aluminium (thermal expansion coefficient of aluminium $\simeq 23 \times 10^{-6}$, UHMPE $\simeq 125-225 \times 10^{-6}$) it is possible to compensate the FLIR system for ambient temperatures over $-40°$ C. to $70°$ C. maintaining constant focii and good optical performance. Although this only provides the FLIR system with two fixed focii it eliminates the need for any movement of lens element G and hence the active mechanics which move lens element G.

As is shown in FIG. 2 the high magnification lens system 23 and the low magnification lens system 24 can be alternately aligned on the common optical axis 19 using a carousel type mechanism which rotates the lens systems 23 and 24 about the point X and the mirror I is rotated about the point R which is the common centre of curvature of surfaces 28 and 29. Because the system of the present invention is extremely compact with an internal f-number for the high magnification mode of less than 1.5 in the airspace between lens elements G and H and because the field of view in image space 18 is 38.1° (horizontal)$\times$26.5° (vertical) and 46.4° (diagonal) the high and low magnification systems 23 and 24 are most easily rotated in the vertical plane. This has the advantage of reducing the maximum field angle of the ray bundles and the clear apertures of the lens elements B,C,D,E and F which together ease the space constraints. The mirror element I can be rotated in the horizontal, vertical, diagonal or any field of view depending on the requirement of the system application however for a given maximum angle of rotation of the mirror element the vertical field of view being the smallest gives a minimum aperture area at the mirror surface 27. FIG. 1 shows the 46.4° field of view whereas FIG. 2 shows the 26.5° field of view arrangement in image space.

One example of the FLIR system is detailed in Tables I and II wherein the radius of curvature of each refractive surface is given together with the aperture diameter of each surface and of the pupil $\phi$, the position of which is used as a datum from which the separation of successive refractive surfaces is defined, together with the nature of the material relevant to such separation interval. Thus, for example, surface 11 has a radius of curvature of $-34.67$ millimeters, the $-$ve sign indicating that the centre of curvature is to the left hand side of surface 11; it is separated by an air space of 11.30 millimeters from the preceding surface, No. 10, in the direction of the pupil $\phi$; it has an aperture diameter of 52.22 millimeters; and is separated from the succeeding surface, No. 12, by a distance 6.20 millimeters in germanium. Table I details the system 20 when it is in the high magnification mode and Table II details the system 20 when it is in the low magnification mode. It will be seen that the sum of all the separations in Table I equals the sum of all the separations in Table II. The coordinates of the rotation point X are 64.3 millimeters from the entrance pupil $\phi$ along the optical axis 19 (to the right) and 3.6 millimeters perpendicular to the optical axis (downwards).

Figure 3:
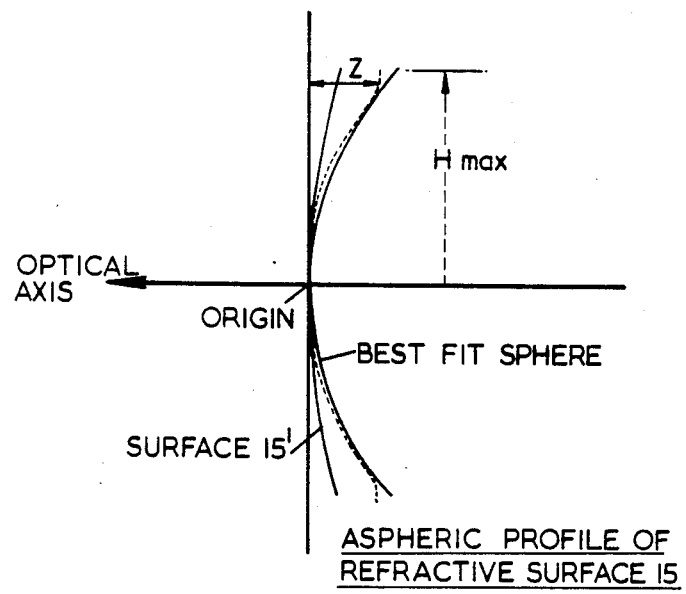
FIG. 3 shows the aspherical profile of the refractive surface of the primary lens element of the optical system of the present invention.

The aspheric profile of refractive surface 15 is shown in FIG. 3, where separations parallel to the optical axis between both the aspheric profile and the best fit sphere, and the datum spherical surface 15' are scaled by a factor of 1000 the aspheric profile is governed by the following equation:

$$Z \cdot C = 1 - \sqrt{1 - C(C \cdot H^2 + B \cdot H^4 + G \cdot H^6 + \ldots)} \quad (1)$$

where,
 Z=distance along optical axis
 C=1/R; R=radius of curvature of surface 15' ($=-177.51$ mm)
 H=radial distance perpendicular to optical axis (maximum value=49.65 mm)
 B=first order aspheric coefficient ($=-1.23\times 10^{-8}$)
 G=second order aspheric coefficient ($=+3.74\times 10^{-12}$)
 ... =higher order terms ($=0.0$).

and the best fit sphere is the spherical surface from which the aspheric profile makes only a small departure. Table V contains calculated values of separation between the aspheric profile and the best fit sphere for different aperture heights, and the radius of curvature of the best fit sphere. It will be noted that the degree of asphericity is small.

This FLIR system produces a high magnification of $\times 6.0$ and a low magnification of $\times 1.9$, and when in the high magnification mode has an internal f-number of 1.00 in the airspace between the lens elements G and H. Colour correction is maintained over the 8.5 to 11.5 micron range and with element G movable focussing is available in the high magnification mode over the range 40 meters to infinity and in the low magnification mode over the range 8 meters to infinity and thermal compensation is available in both modes of magnification over the range $-10°$ C.$-+50°$ C. with minimal degradation in overall performance. For practical purposes, if the performance degradation is acceptable, the range for focus in the high and low modes of magnification can be increased to 8 meters to infinity and 4 meters to infinity respectively and in both modes of magnification the range for thermal compensation can be increased to −40° C.−+70° C. Alternatively element G and all the other lens elements can be fixedly mounted thus providing two fixed focii and thermal compensation achieved by passive means and being available over the range −40° C.−+70° C. with minimal degradation in overall performance. Specific values of image quality for this FLIR system are given in Tables III and IV, the former providing data relevant to the high magnification mode when focussed at a distance of approximately 2500 meters and the latter providing data relevant to the low magnification mode when focussed at a distance of approximately 111 meters.

The FLIR system which has been described when in the high magnification mode provides high performance over at least two-thirds of the full field with a telescope primary objective aperture diameter enlarged by 12.4% to accommodate pupil aberrations and when in the low magnification mode provides high performance over at least two-thirds of the full field. For the high and low magnification modes the FLIR system produces angular distortion at the maximum field angle of only about +1.2% and +1.5% respectively, the +ve sign indicating increasing magnification with increasing field angle.

Particularly in the low magnification mode the FLIR system described has ray bundles which converge to a minimum cross-sectional area adjacent the window element J as is shown in FIGS. 1 and 2. Accordingly the field of view of the FLIR system can be increased substantially without narcissus or vignetting effects by rotation of the mirror element I.

The system detailed in Tables I-V inclusive can be scaled and optimised to provide a wide range of high and low magnifications, the ratio between the high and low magnifications being typically within the ranges 6:1 and 2:1, with the general lens configuration remaining constant. Although only two aspheric coefficients have been used in the equation to provide the lens solution given above more (i.e. higher order) aspheric coefficients can be used if so wished. It is also possible to optimise this system in such a way that it can provide a different field of view and pupil diameter in image space thus making it suitable for attachment to different detector systems which may or may not use scanning mechanisms. It is to be noted that all details given in Tables I to VI inclusive are for 20° C. and the f-number specified herein is derived from the formula $(2 \cdot \sin \phi)^{-1}$ where $\phi$ is the half angle of the cone formed by the axial field pencil after refraction from the lens element on which the pencil is incident.

Although the embodiment describes only refractive surface 15 being aspheric it will be appreciated that the same performance could be achieved by making only surface 16 aspheric or by making both surfaces 15, 16 aspheric, this latter arrangement having the advantage that the total degree of asphericity will be apportioned between the two surfaces so that each will then have a much reduced degree of asphericity in comparison with that of surface 15 as detailed in Table V.

TABLE I

| Lens | Surface | Separation | Radius of Curvature | Material | Aperture Diameter [x] |
|---|---|---|---|---|---|
| Entrance Pupil* | 0 | 0 | Flat | Air | 15.30 |
| A | 1 | 19.52 | −199.20 | Air | 32.80 |
|   | 2 | 4.18 | −100.08 | Ge | 33.92 |
| B | 3 | 8.50 | −476.46 | Air | 36.54 |
|   | 4 | 3.75 | −109.22 | Ge | 36.86 |
| C | 5 | 0.50 | 30.48 | Air | 33.01 |
|   | 6 | 13.13 | 22.21 | Ge | 20.96 |
| G | 13 | 64.80 | 166.09 | Air | 64.62 |
|   | 14 | 5.75 | 139.70 | As/Se/Ge(BSI) | 65.12 |
| H | 15'# | 42.85 | −177.51 | Air | 99.25 |
|   | 16 | 10.09 | −114.30 | Ge | 102.73 |
| I | 27 | 71.00 | Flat | Air (Reflection) | 197.00$ |
| J | 28 | 103.00 | −103.00 | Air | 138.00$ |
|   | 29 | 10.00 | −113.00 | Ge | 151.00$ |

*Maximum field angle at entrance pupil = 46.4°.
[x] As required by this magnification mode.
Surface 15 has an aspheric profile.
$Variable aperture diameter.

TABLE II

| Lens | Surface | Separation | Radius of Curvature | Material | Aperture Diameter [x] |
|---|---|---|---|---|---|
| Entrance Pupil* | 0 | 0 | Flat | Air | 15.30 |
| A | 1 | 19.52 | −199.20 | Air | 32.80 |
|   | 2 | 4.18 | −100.08 | Ge | 33.92 |
| D | 7 | 8.37 | 31.75 | Air | 38.37 |
|   | 8 | 7.73 | 27.81 | Ge | 31.93 |
| E | 9 | 42.25 | −86.00 | Air | 45.89 |
|   | 10 | 4.81 | −108.51 | Ge | 49.22 |
| F | 11 | 11.30 | −34.67 | Air | 52.22 |
|   | 12 | 6.20 | −36.19 | Ge | 58.54 |
| G | 13 | 10.20 | 166.09 | Air | 74.95 |
|   | 14 | 5.75 | 139.70 | As/Se/Ge(BSI) | 74.60 |
| H | 15'# | 42.85 | −177.51 | Air | 97.07 |
|   | 16 | 10.09 | −114.30 | Ge | 100.27 |
| I | 27 | 71.00 | Flat | Air (reflection) | 197.00$ |
| J | 28 | 103.00 | −103.00 | Air | 138.00$ |
|   | 29 | 10.00 | −113.00 | Ge | 151.00$ |

*Maximum field angle at entrance pupil = 46.4°.
[x] As required by this magnification mode.
Surface 15 has an aspheric profile.
$Variable aperture diameter.

TABLE III

Approximate R.M.S. Spot Sizes in Object Space (in milliradians).

| Field | Monochromatic at 10.0 microns | *Chromatic over 8.5–11.5 microns |
|---|---|---|
| Axial | 0.052 | 0.077 |
| ⅓ | 0.063 | 0.094 |
| ⅔ | 0.083 | 0.113 |
| Full | 0.131 | 0.157 |

*Given as an equally weighted three wavelength accumulated measurement, the wavelengths being 8.5, 10.0 and 11.5 microns.

TABLE IV

Approximate R.M.S. Spot Sizes in Object Space (in milliradians)

| Field | Monochromatic at 10.0 microns | *Chromatic over 8.5–11.5 microns |
|---|---|---|
| Axial | 0.448 | 0.453 |
| ⅓ | 0.477 | 0.486 |
| ⅔ | 0.583 | 0.578 |

TABLE IV-continued

Approximate R.M.S. Spot Sizes in Object Space (in milliradians)

| Field | Monochromatic at 10.0 microns | *Chromatic over 8.5-11.5 microns |
|---|---|---|
| Full | 0.389 | 0.429 |

*Given as an equally weighted three wavelength accumulated measurement, the wavelengths being 8.5, 10.0 and 11.5 microns.

TABLE V

| Radial Distance Perpendicular to Optical Axis (mm) | Depth# of Aspheric Profile (microns) |
|---|---|
| 0.00 | 0.00 |
| 1.99 | −0.02 |
| 3.97 | −0.08 |
| 5.96 | −0.17 |
| 7.94 | −0.29 |
| 9.93 | −0.43 |
| 11.92 | −0.59 |
| 13.90 | −0.75 |
| 15.89 | −0.90 |
| 17.87 | −1.03 |
| 19.86 | −1.14 |
| 21.85 | −1.20 |
| 23.83 | −1.21 |
| 25.82 | −1.17 |
| 27.80 | −1.08 |
| 29.79 | −0.93 |
| 31.78 | −0.74 |
| 33.76 | −0.52 |
| 35.75 | −0.30 |
| 37.73 | −0.11 |
| 39.72 | −0.00 |
| 41.71 | −0.02 |
| 43.69 | −0.26 |
| 45.68 | −0.81 |
| 47.66 | −1.78 |
| 49.65 | −3.30 |

Radius of curvature of the best fit sphere = −177.19 mm

Depth of aspheric profile is defined as the separation distance between points, of equal radial distance perpendicular to the optical axis, on the aspheric profile and best fit sphere.
The negative sign signifies the removal of lens element material from the best fit sphere to obtain the aspheric profile.

TABLE VI

| Material | Refractive index* | V-value# |
|---|---|---|
| BS2 | 2.85632 | 248 |
| BSA | 2.77917 | 209 |
| TI 1173 | 2.60010 | 142 |
| AMTIR | 2.49745 | 169 |
| BSI | 2.49158 | 152 |
| TI 20 | 2.49126 | 144 |
| ZnSe | 2.40653 | 77 |
| KRS 5 | 2.37044 | 260 |
| CsI | 1.73933 | 316 |
| CsBr | 1.66251 | 176 |
| KI | 1.62023 | 137 |

*The refractive index is for 10 microns.
Over the wavelength range 8.5-11.5 microns.

What is claimed is:

1. A forward looking infrared optical system comprising a refractor telescope having a fixed focus achromatic telephoto objective system composed of a primary objective lens element and a secondary objective lens element aligned on a common optical axis, at least one refractive surface of the primary objective element being aspheric and each of the other refractive surfaces of the objective system being substantially spherical, the secondary objective lens element being negatively powered and having a refractive index lower than that of the primary objective element which is positively powered, the degree of asphericity of said aspheric surface or surfaces being such that the telescope is neither afocal nor diffraction limited, in combination with an optically powered window the two refractive surfaces of which are substantially spherical and concentric and have their common centre of curvature located on said common optical axis, wherein the spherical aberration introduced to the system by the window is compensated by the spherical aberration of the telescope so that the system is substantially afocal and diffraction limited.

2. A system as claimed in claim 1, wherein a fold mirror is interposed between the powered window and the primary objective lens element and the common centre of curvature of said window lies on the reflective surface of said mirror.

3. A system as claimed in claim 2, wherein the fold mirror is pivotal about the point of reflection thereon of the optical axis.

4. A system as claimed in claim 1, wherein the telescope comprises a high magnification lens system and a low magnification lens system which are alternatively alignable on said optical axis and when said low magnification lens system is so aligned the optical ray bundles passing through the system converge to a minimum cross-sectional area in the interspace between the window and the primary objective lens element.

5. A system as claimed in claim 1, wherein the lens elements of the system have refractive surface curvatures, separation distances between refractive surfaces (RS) as measured successively from the refractive surface of the secondary objective lens element distal to the window, and materials as set forth in the following table:

| Lens | Surface | Separation (mm) | Radius of Curvature (mm) | Material |
|---|---|---|---|---|
| Objective System | | | | |
| Secondary | 1st RS | — | 166.09 | Air |
| Element | 2nd RS | 5.75 | 139.70 | As/Se/Ge(BS1) |
| Primary | 1st RS | 42.85 | Aspheric | Air |
| Element | 2nd RS | 10.09 | −114.30 | Ge |
| Window | 1st RS | 174.00 | −103.00 | Air |
| | 2nd RS | 10.00 | −113.00 | Ge | where the aspheric refractive surface has its profile governed by the equation:

$$Z \cdot C = 1 - \sqrt{1 - C(CH^2 + BH^4 + GH^6)}$$

Z being the distance parallel to the optical axis between the aspheric surface and a line perpendicular to the optical axis whcih contains the origin point where the datum spherical surface and the aspheric surface meet; H being the radial distance, perpendicular to the optical axis, from the optical axis to a point on the aspheric surface; and C being the inverse of the radius of curvature of the datum surface and having a value of $-177.51^{-1}$; B being a constant of value $-1.23 \times 10^{-8}$; and G being a constant of value $+3.74 \times 10^{-12}$.

* * * * *